Sept. 5, 1961 D. J. LARSON 2,998,965
PUSH BLOCK FOR TRACTOR MOUNTED RIPPER
Filed March 23, 1960 2 Sheets-Sheet 1
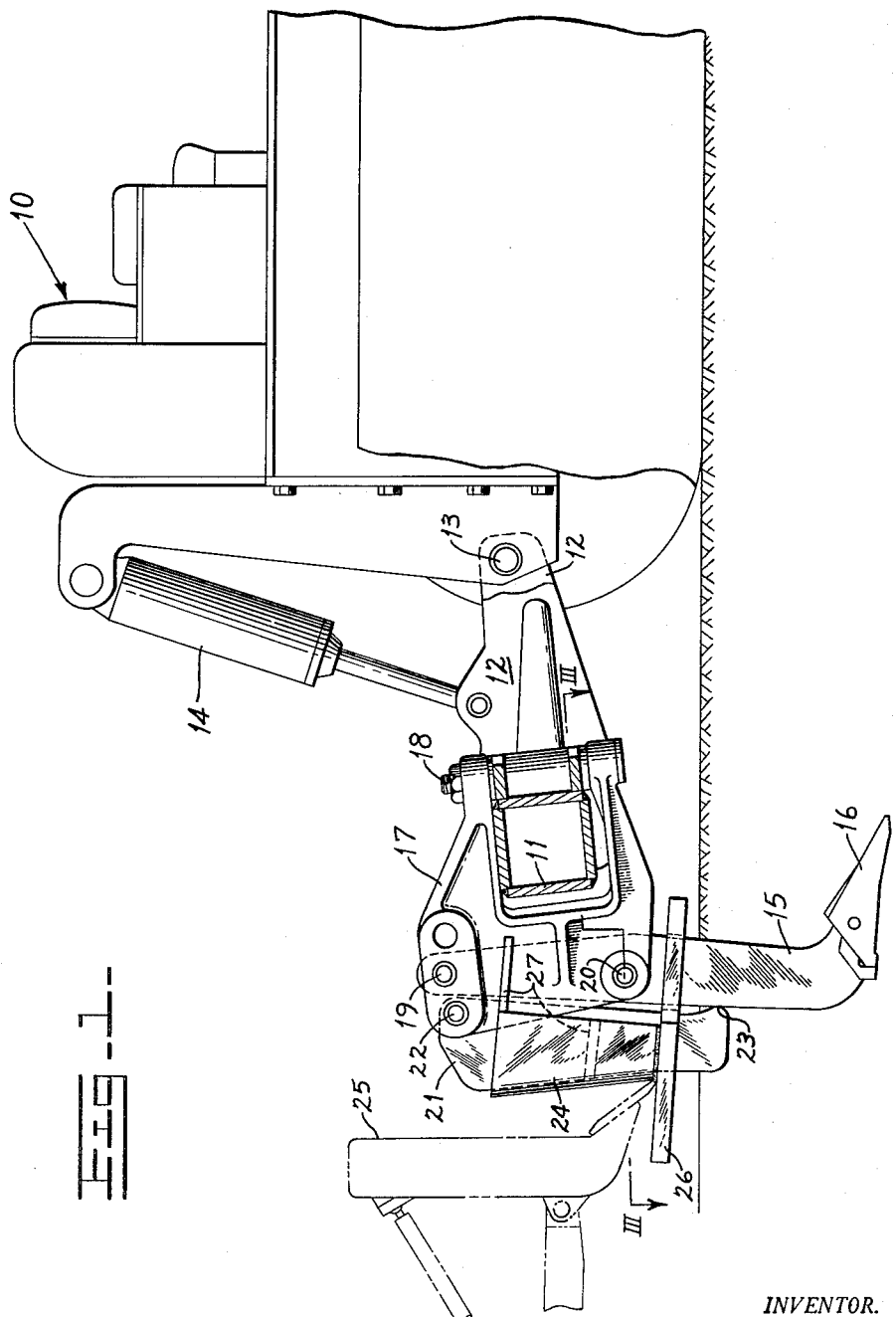
INVENTOR.
DONALD J. LARSON
BY
*Fryer and Zimwald*
ATTORNEYS Sept. 5, 1961 D. J. LARSON 2,998,965
PUSH BLOCK FOR TRACTOR MOUNTED RIPPER
Filed March 23, 1960 2 Sheets-Sheet 2
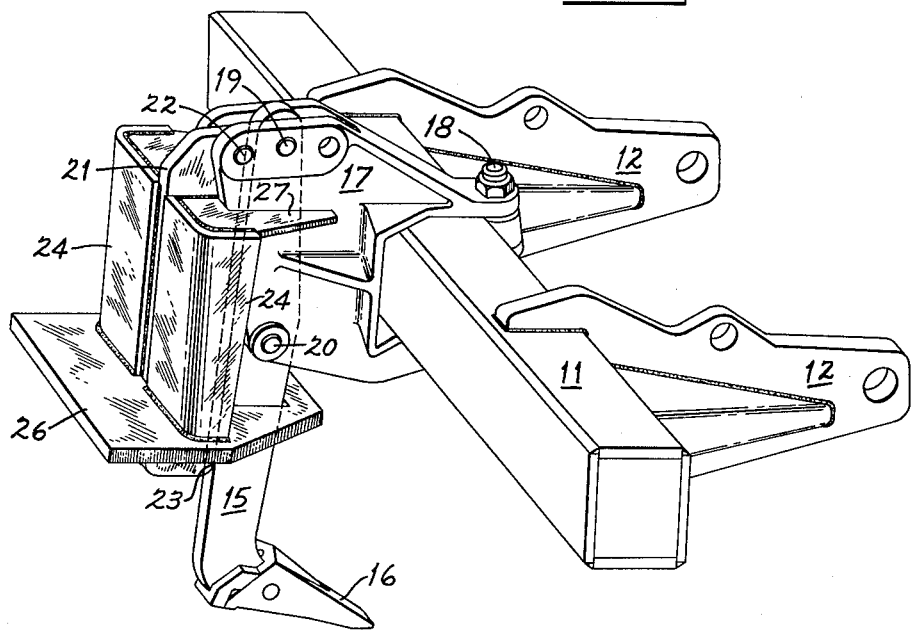
Fig-2-
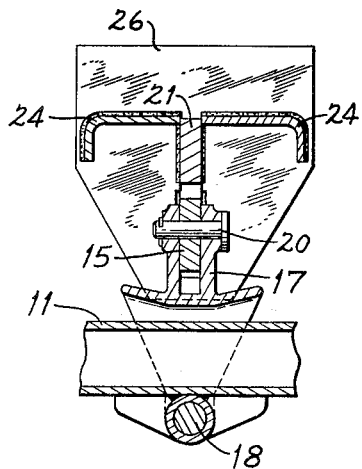
Fig-3-
INVENTOR.
DONALD J. LARSON
BY
Fryer and Zimwald
ATTORNEYS

United States Patent Office 2,998,965
Patented Sept. 5, 1961

2,998,965
PUSH BLOCK FOR TRACTOR MOUNTED RIPPER
Donald J. Larson, Joliet, Ill., assignor to Caterpillar Tractor Co., Peoria, Ill., a corporation of California
Filed Mar. 23, 1960, Ser. No. 17,157
3 Claims. (Cl. 262—8)

This invention relates to push blocks for tractor mounted rippers or more particularly to means for receiving the thrust of a tractor employed to aid another tractor which is pulling a ripper tooth through the earth.

It is conventional practice to loosen earth and rock for many reasons, such for example as preparing it for removal by a bulldozer or scraper, by pulling a ripper tooth or tip through the earth. The tip is carried at the lower end of a downwardly extending shank and the shank is connected to draft means behind a tractor by pins which pass through it in a manner which subjects them to shearing force.

In some areas of hard packed earth or rock, the tractor pulling the ripper may not have sufficient tractive effort to pull a ripper through the earth at an economical rate and a second tractor is employed to aid by pushing. In arrangements presently known to enable a second tractor to push a tractor drawn ripper, the pushing force is directed to some part of the draft assembly in a manner to increase the shearing forces on the pins which support the upper shank. These increased forces often shear the pin or effect damage to other parts of the draft assembly.

It is the object of the present invention to provide a push block or member on the draft assembly of a ripper which will receive the thrust of a pushing tractor in a manner to direct the greater portion of said thrust against the ripper shank to prevent the application of excessive shear forces to the shank supporting pin.

A further object of the invention is to provide a push block of the kind described of simple construction which is readily and detachably secured to a conventional type of ripper draft assembly.

Further and more specific objects and advantages of the invention and the manner in which it is carried into practice are made apparent in the following specification wherein the invention is described in detail by reference to the accompanying drawings.

In the drawings:

FIG. 1 is a view in side elevation of a ripper and draft assembly therefor with a portion of the draft assembly broken away and schematically illustrating a portion of the tractor which pulls the ripper and showing, in broken lines, the bulldozer blade of an assisting tractor engaging a push block embodying the present invention;

FIG. 2 is a perspective view of the draft assembly ripper and push block shown in FIG. 1; and FIG. 3 is a sectional view taken through the push block and a portion of the draft assembly on the line III—III of FIG. 1.

In FIG. 1 of the drawings, the rear end of a track-type tractor is schematically illustrated at 10 as fitted with a draft frame, also illustrated in FIG. 2, which comprises a transverse beam 11 connected to the tractor by a pair of draft arms 12. The draft arms are pivotally connected to the rear of the tractor as by pins 13 and the entire frame may be raised and lowered about this pivotal connection by any suitable means such for example as a hydraulic jack illustrated at 14. A ripper shank 15 with a removable hardened tip 16 is connected with the beam 11 by a clevis 17 which embraces the beam and is pivotally connected thereto by a pin or bolt shown at 18. The rear of the clevis is bifurcated to receive the upper end of the ripper shank which is held in place by pins 19 and 20 passing through perforations in the bifurcated portion of the clevis and the shank itself as also shown in FIG. 3.

With the construction thus far described which is conventional, it is apparent that the full force of the ripper advancing through the earth is borne by the pins 19 and 20 wherein it is reacted as a shearing force and any pushing effort intended to assist the tractor 10 by engagement with the clevis or the beam 11 increases this shearing force upon the pins 19 and 20. The force applied to the pin 20 is in a rearward direction and that applied to pin 19 is in a forward direction due to the tendency of the shank to rotate about the pin 20.

The push block of the present invention comprises a vertically disposed bar 21 aligned with the rear edge of the ripper shank 15 and pivotally supported in the bifurcated portion of the clevis as by a pin 22 which extends through the bar 21 and through perforations in the clevis which are one of three sets of perforations shown and ordinarily employed for adjusting the position of the ripper shank. The bar 21 engages the ripper shank only at its lower end as indicated at 23 and at a point below the lowermost shank supporting pin 20. A push plate 24 is provided by welding suitably shaped members to the rear edge of the bar 21 for engagement by the blade of a bulldozer on a pushing tractor, as indicated in broken lines at 25 in FIG. 1, or by any other portion of the tractor employed for pushing. A rest plate 26 is secured in a generally horizontal position at the bottom of the push plate 24 and preferably extends forwardly wherein it has a perforation of sufficient size to embrace the ripper shank 15 without actually engaging it. Suitable gusset plates shown at 27 may also be employed for strengthening the push plate 24. The purpose of the rest plate 26 is to enable the operator of the pushing tractor to easily place the blade in a suitable pushing position and to insure that the thrust is received by the bar 21 at a relatively low point.

With the construction shown, the effort of the pushing tractor does not increase the shearing forces on the pins 19 and 20 in direct proportion. A major portion of the pushing force is imposed directly on shank 15 through point 23 while a lesser amount of such force is directed to the shank by way of pin 22, clevis 17, and pin 20.

The push block of the present invention has the advantage that it is easily removed for jobs where a pusher tractor is not required and it enables the addition of a push block to a conventional ripper without the necessity of a special clevis or other additional parts.

I claim:

1. A push block for a tractor mounted ripper which includes a ripper shank connected to a draft frame on the tractor by two vertically spaced pins comprising an elongated member disposed behind the ripper shank and connected to the draft frame adjacent its upper end and contacting the rear edge of the ripper shank only at a point below the lowermost of said two pins, and means at the rear edge of said member for engagement by a pushing element of a tractor.

2. A push block for a tractor mounted ripper which includes a ripper shank connected o a draft frame on the tractor by two vertically spaced pins comprising an elongated member disposed behind the ripper shank and connected to the draft frame adjacent its upper end and contacting the rear edge of the ripper shank only at a point below the lowermost of said two pins, and means at the rear edge of said member for engagement by a pushing element of a tractor, said means being disposed to receive the pushing element at a point below the lowermost of said pins.

3. A push block for a tractor mounted ripper in which a ripper shank is supported by vertically spaced pins in a bifurcated portion of a clevis carried by a tractor draft frame comprising a bar-like element suspended from a pin in said bifurcated portion behind the shank adjacent the top of the shank and having its lower portion only engaging the back of the shank, a push plate secured to the back of said bar-like element, and a rest plate extending rearwardly from said element to support a pushing element on a second tractor at a level beneath the lowermost of the shank supporting pins.

References Cited in the file of this patent

UNITED STATES PATENTS

| | | |
|---|---|---|
| 2,490,904 | Gustafson | Dec. 13, 1949 |
| 2,646,287 | Kytola | July 21, 1953 |
| 2,769,625 | Wooldridge | Nov. 6, 1956 |